United States Patent
Branscombe et al.

(10) Patent No.: US 6,653,975 B2
(45) Date of Patent: Nov. 25, 2003

(54) METHOD OF CONFIGURING SATELLITE CONSTELLATION DESIGN USING MULTIPLE DISCRETE SWITCHABLE SPOT BEAMS

(75) Inventors: Steven L. Branscombe, Westminster, CA (US); William F. Courtney, Long Beach, CA (US); Michael S. Munoz, Redondo Beach, CA (US); Ray M. Nuber, Rancho Palos Verdes, CA (US); Fritz B. Mezger, Philadelphia, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 66 days.

(21) Appl. No.: 09/990,941

(22) Filed: Nov. 21, 2001

(65) Prior Publication Data

US 2003/0095064 A1 May 22, 2003

(51) Int. Cl.$^7$ ................................................ H04B 7/185
(52) U.S. Cl. ...................... 342/354; 342/374; 455/429
(58) Field of Search ................................ 342/354, 374; 455/429, 427

(56) References Cited

U.S. PATENT DOCUMENTS

| | | | |
|---|---|---|---|
| 5,576,721 A | * | 11/1996 | Hwang et al. ............... 343/753 |
| 5,926,758 A | * | 7/1999 | Grybos et al. ............... 455/429 |
| 6,211,835 B1 | | 4/2001 | Peebles et al. |
| 6,215,452 B1 | | 4/2001 | Chandler et al. |
| 6,236,375 B1 | | 5/2001 | Chandler et al. |
| 6,434,384 B1 | * | 8/2002 | Norin et al. ................. 455/429 |

* cited by examiner

*Primary Examiner*—Theodore M. Blum
(74) *Attorney, Agent, or Firm*—Antonelli, Terry, Stout, & Kraus, LLP

(57) ABSTRACT

A method and computer program to configure feeds on a satellite (300, 310, 320) to provide for redundant coverage when a satellite (300, 310, 320) fails. Further, this method and computer program can enable the switching of feeds from commands from a ground station (30) to activate certain feeds and deactivate other feeds when demand for service changes. In addition, this method and computer program allow for repositioning of satellites so that when one satellite fails another satellite may take over its area of coverage by switching active feeds without the need for placing another satellite in orbit.

33 Claims, 9 Drawing Sheets

Flowchart showing a method for configuring two satellites for flexible coverage

Flowchart showing a method for configuring two satellites for dual coverage

Flowchart showing a method for configuring two satellites for flexible coverage

Flowchart showing a method for backing up a satellite in one orbital slot with a satellite from a different orbital slot

METHOD OF CONFIGURING SATELLITE CONSTELLATION DESIGN USING MULTIPLE DISCRETE SWITCHABLE SPOT BEAMS

BACKGROUND OF THE INVENTION

1. Field of the Invention

This invention relates generally to a method of configuring satellite constellation designs using multiple discrete switchable beams. Further, the present invention relates to a method of configuring antenna feeds in a feed array of an antenna in a satellite and the positioning of the satellite in orbit to maximize coverage for profitability, flexibility, changing demand, and redundancy for a satellite network.

2. Discussion of the Related Art

Today the skies above us have become crowded with communication satellites whose sole function is to relay information received from ground stations to other ground stations. The types of satellites utilized for communication generally fall into two categories based on the satellites' position above the planet. The first type is low Earth orbiting satellites, while the second are in a geo-synchronous Earth orbit. In the case of geo-synchronous Earth orbiting satellites, the satellite remains in the same relative position above the earth, and a parabolic satellite dish is typically used to send and receive signals to and from the satellite. In the early days of satellite communication, these geo-synchronous orbiting satellites were confined to telephone communications. However, today all forms of information are being relayed by these geo-synchronous satellites including, but not limited to, voice, computer data, video, television, radio and satellite telephones.

Therefore, today several major industries are heavily dependent upon reliable communications service via satellites being continuously available. Unfortunately, satellites fail, just as all electronic equipment made by man eventually must be repaired or replaced. However, it is at present impossible to send a repairman immediately to repair a satellite in geo-synchronous orbit. In the early days when satellites were used exclusively for telephone communications, landlines and undersea cables still could be used to provide access for customers if a satellite failed. However, this is no longer the case for other applications for which communications satellites in geo-synchronous orbit are used for.

FIG. 1 is an illustration of a satellite communication network configuration in which total redundancy is provided by two satellites. Satellites 20 and 40 are used to communicate to ground stations 30 located within a region of the planet Earth 10 using a uniform distribution methodology. This uniform distribution methodology would allow for communications to an entire region of Earth 10, such as, but not limited to, North America. Should either satellite 20 or satellite 40 fail, the other satellite may completely take over its communications function. However, this complete redundancy solution is expensive to implement since two satellites must be used just in case one fails. Further, should demand increase in one location it may not be possible to reconfigure the satellites in orbit to handle the additional load from the increased traffic seen in one area. In addition, building in excess capacity in a satellite may not be possible at the time the satellite is being designed, since that may be more than a year in advance of it being launched.

FIG. 2 is an example illustration of the coverage that may be seen from three satellites using the uniform distribution methodology. Coverage areas 200 and 210 may be generated by satellites 20 and 40 in which, rather than complete overlap and redundancy, only partial overlap in a geographical area is accomplished. Via this mechanism satellite 20 would provide coverage area 200 and satellite 40 would provide coverage area 210. Overlap would occur in such areas as the East Coast of United States, Central America, and portions of South America. Therefore, should satellite 20 fail, the East Coast of United States could still be covered through satellite 40. However, this still leaves the West Coast of United States without service, and should traffic increase in demand in the Midwest, such as Chicago, even with both satellites 20 and 40 in full operation, inadequate service could potentially be seen via communications through satellite 20.

One mechanism utilized to overcome the foregoing problems of redundancy and capacity has been to utilize multiple feeds to form multiple spot beams to target specific locations on the planet Earth 10. However, the performance degradations of spot beams over a wide geographic region have previously limited the spot beam applications to a relatively small number of feeds within a single antenna. However, as illustrated in U.S. Pat. No. 6,211,835 to Pebbles et al., U.S. Pat. No. 6,236,375 to Chandler et al., and U.S. Pat. No. 6,215,452 to Chandler et al., herein incorporated by reference in their entireties, it is now possible to have a large number of spot beams in which each spot beam individually targets specific locations on the planet Earth 10 using what is hereinafter referred to as a hemispherical earth coverage antenna.

FIG. 3 is an illustration of spot beams positioned over predefined Earth locations utilizing the previously mentioned hemispherical earth coverage antenna. Three different satellites 300, 310, 320 are shown respectively located at 101 degrees west longitude, 47 degrees west longitude, and 122.5 degrees east longitude. The satellite 300 has most of its spot beams 330 directed towards the North American continent. Satellite 310 positions its spot beams 340 to cover South America and the East Coast of The United States. Satellite 320 in turn has its spot beams 350 distributed to cover portions of Asia and Australia. It should be noted that more than one spot beam may be directed at any given location within the range of the satellite. Further, the positioning of the spot beams is dependent upon the physical alignment of the feeds in the antenna of the satellite and the longitude at which the satellite is positioned in geo-synchronous orbit, as detailed in U.S. Pat. Nos. 6,211,835, 6,236,375, and 6,215,452, incorporated herein by reference in their entireties. Once the feeds are set within a satellite, they may not be changed individually to target another geographical location. However, unlike a uniform distribution method, using this non-uniform methodology the spot beams may be directed towards those areas where demand is highest and profitability maximized. Therefore, the positioning of feeds to generate spot beams is critical in determining the profitability and redundancy of a satellite communications network.

However, a tool such as a hemispherical earth coverage antenna, without a comprehensive method of configuring the feeds and positioning the satellites, is like having all the materials to build a house without the blueprints. Even an experienced contractor might discover needlessly duplicated work or work items completely left off the structure. In the case of a global satellite communications system in geo-synchronous Earth orbit, several factors must be taken into consideration in the configuring of feeds on individual antennas and the positioning of satellites in geo-synchronous orbits to maximize profitability, coverage and redundancy in case of failure of a satellite. These factors include present demand for satellite communications, population shifts which may impact future demand, areas which may be prone to sudden shifts in demand, areas where constant uninterrupted service is absolutely necessary. Predicting such factors in order to properly configure a satellite and place it in the proper orbit is difficult, to say the least. Further, unforeseen circumstances may require thereplacement, substitution or reconfiguration of a satellite, which may be extremely difficult to do while the satellite is being built.

Therefore, what is needed is a system, method and computer program that will enable spot beam coverage of identified high traffic/profit geographical locations such as cities. Further, this system, method and computer program should allow for the switching of spot beams to concentrate capacity on a particular geographic area when unexpected high demand is seen in that area. Further, this system, method and computer program should further build in redundancy in the positioning of spot beams and satellites so that when a failure occurs in a satellite, other antennas on that satellite or other satellites in orbit may immediately be reconfigured from a controlling ground station to cover the lost area. Further, in the case where an entire satellite is lost due to a malfunction, the configuration of spot beams should be such that another satellite in orbit may be moved to a different longitude and have certain of its feeds set up to take over for the satellite that has malfunctioned.

SUMMARY OF THE INVENTION

In accordance with the teachings of the present invention, a method and a computer program are disclosed in which a constellation of satellites is configured. This method and computer program determine a first set of population centers to be covered by a first satellite. The method and computer program then determine a second set of population centers to be covered by a second satellite. Thereafter, the method and computer program determine a third set of population centers which are all common population centers between the first set of population centers and the second set of population centers. Thereafter, mapping of a first union of the first set of population centers and the second set of population centers onto a feed antenna array for the first satellite is done. Finally, the method effects a mapping of a second union of the second set of population centers and the third set of population centers onto a feed antenna array for the second satellite.

Further, in accordance with the present invention. there are provided a method and a computer program for configuring feeds on an antenna of a satellite. This method and computer program determine a first set of primary population centers to be covered by the satellite. The method and computer program then determine a second set of secondary population centers to be covered by the satellite. Thereafter, a mapping occurs of the first set and the second set into the feeds of the antenna of the satellite. Finally, the connectivity is determined between the first set and the second set to maximize at least one optimization criterion.

Further in accordance with the present invention, a method and computer program for configuring several feeds on several satellites are disclosed to supply backup redundancy for a failed satellite. This method and computer program determine a first set of population centers to be covered by a first satellite. The method and computer program then determine a second set of population centers to be covered by a second satellite. Mapping is then done on the first set of population centers onto the feed array of the first satellite. Then, mapping of a second set of population centers onto the feed array of the second satellite is done. Finally, the union between the mapped first set of population centers and the mapped second set of population centers is determined.

Additional objects, features and advantages of the present invention will become apparent from the following description and the appended claims when taken in connection with the accompanying drawings.

DETAILED DESCRIPTION OF THE PREFERRED EMBODIMENTS

The following discussion of the example embodiments directed to a process for configuring a satellite constellation is merely exemplary in nature, and is in no way intended to limit the invention or its applications or uses.

Figure 1:
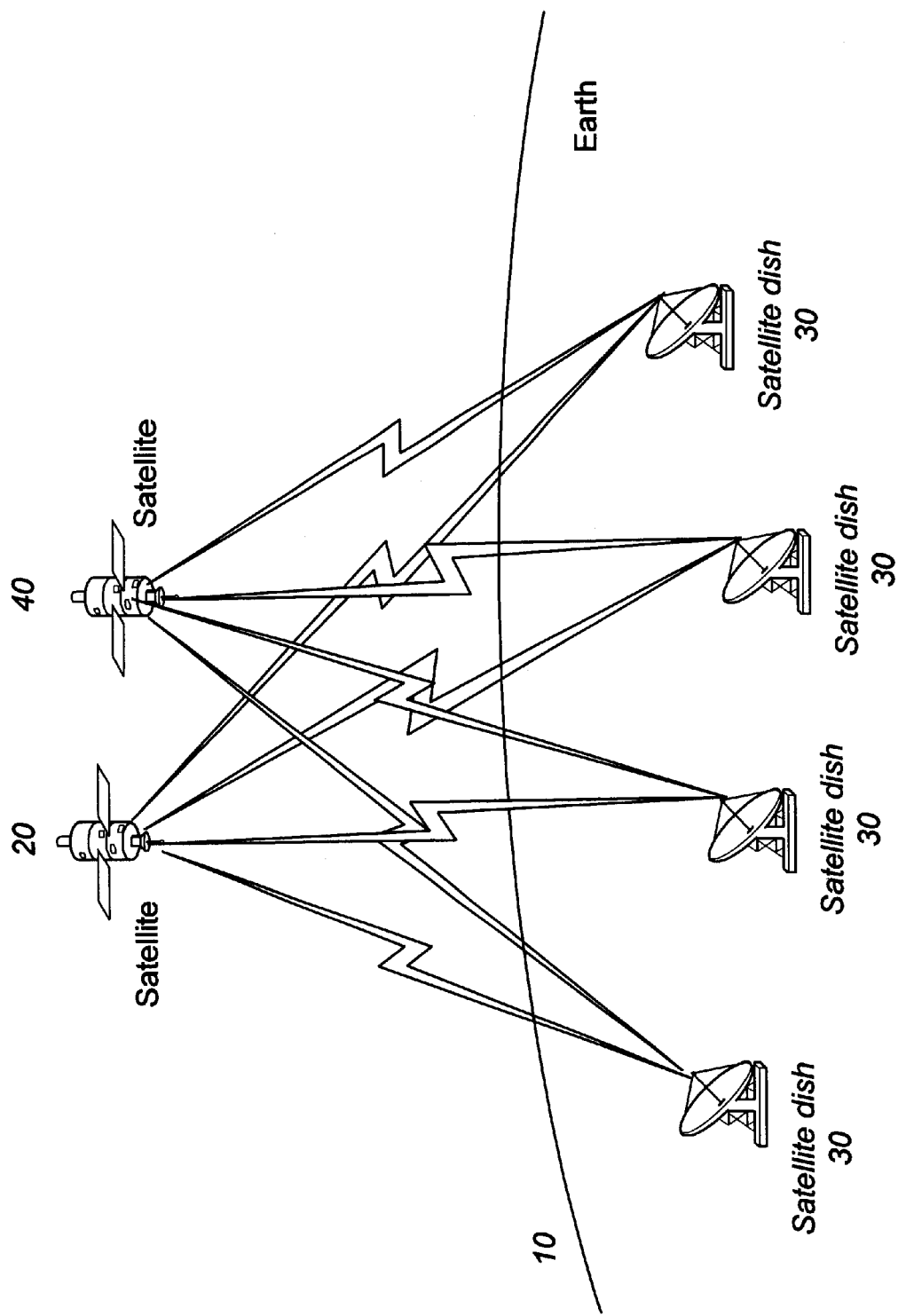
FIG. 1 is an illustration of a satellite communication network configuration in which total redundancy is provided by two satellites.
Figure 2:
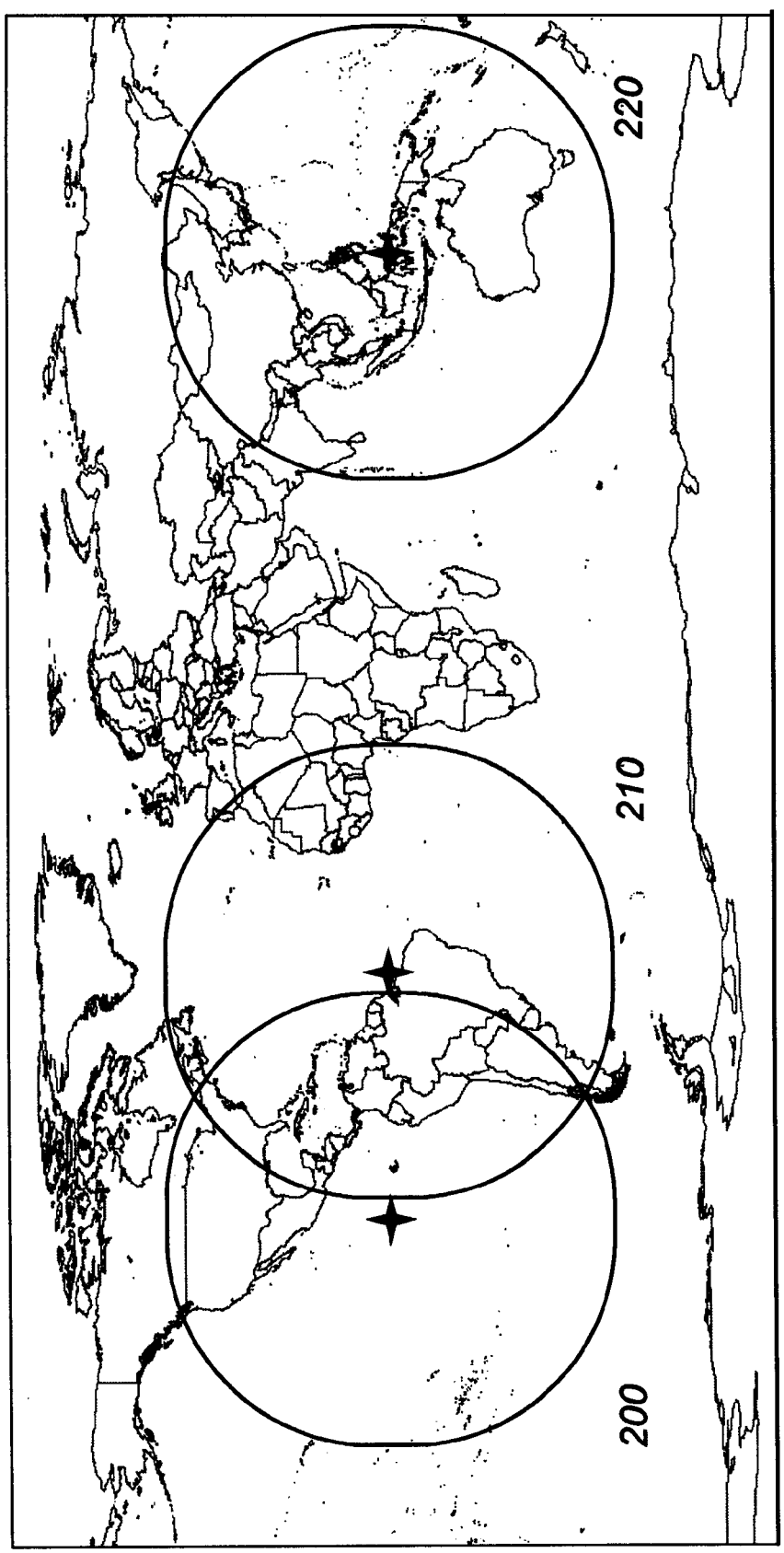
FIG. 2 is an example illustration of the coverage that may be seen from three satellites using the uniform distribution methodology.
Figure 3:
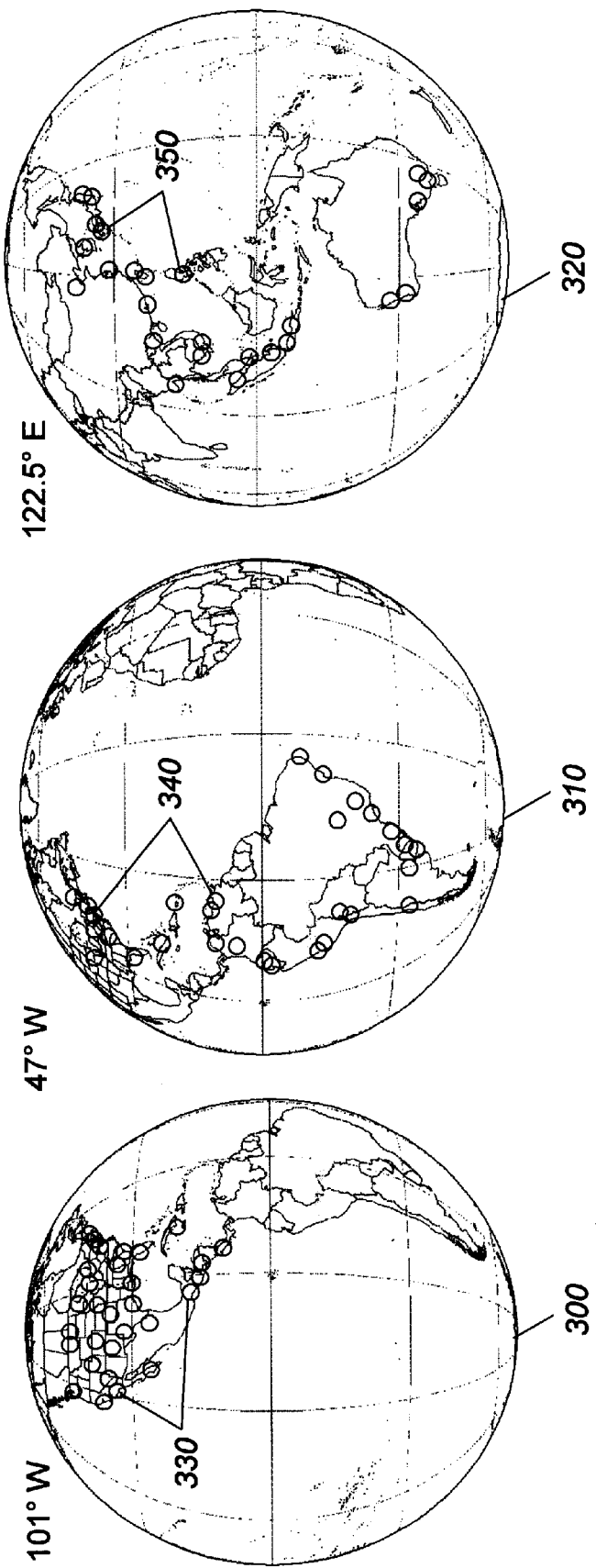
FIG. 3 is an example illustration of spot beams positioned over predefined Earth locations utilizing a hemispherical earth coverage antenna.
Figure 4:
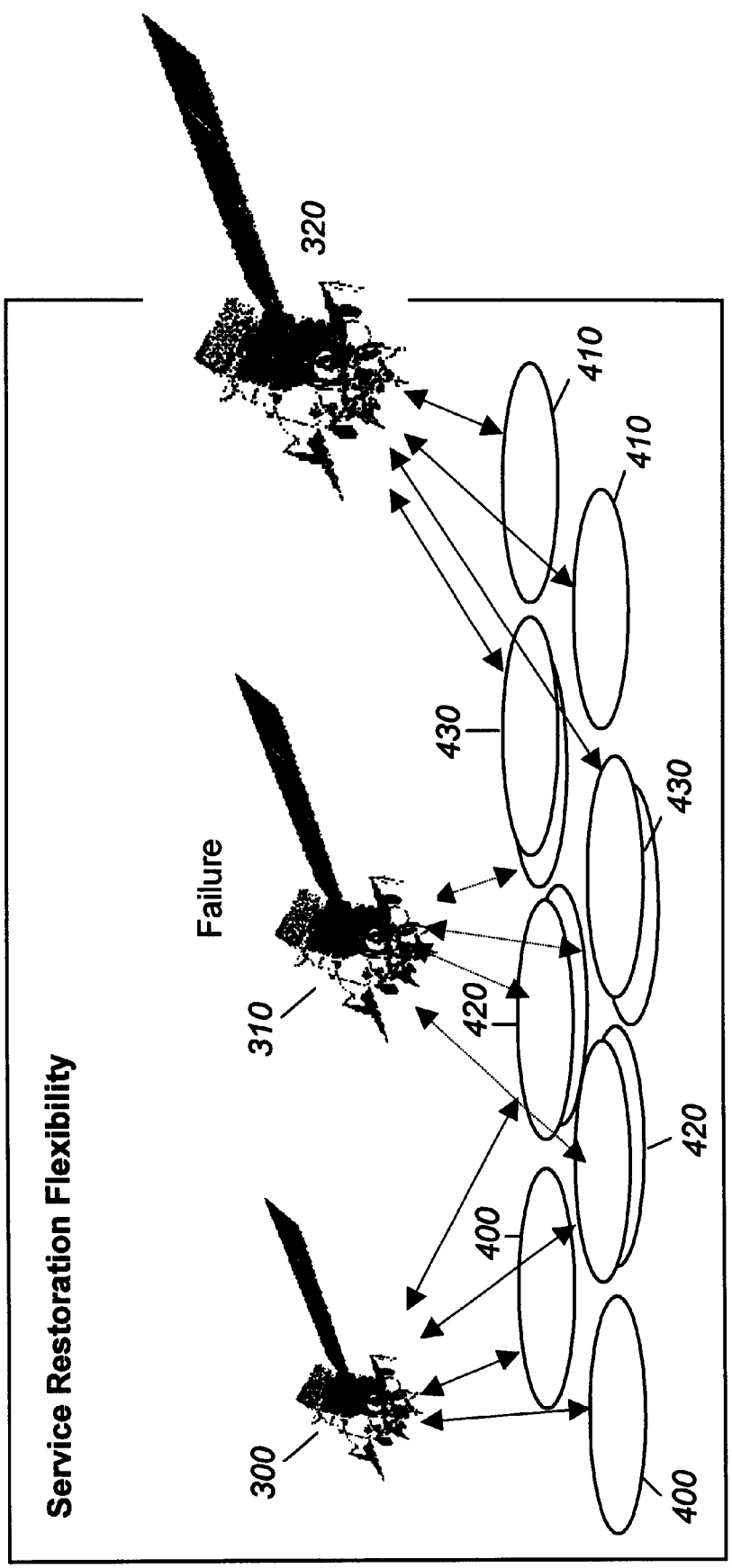
FIG. 4 is a diagram illustrating the coverage areas of a failed satellite being taken over by two other satellites in an example embodiment of the present invention, as further detailed in FIGS. 7 through 9.
Figure 7:
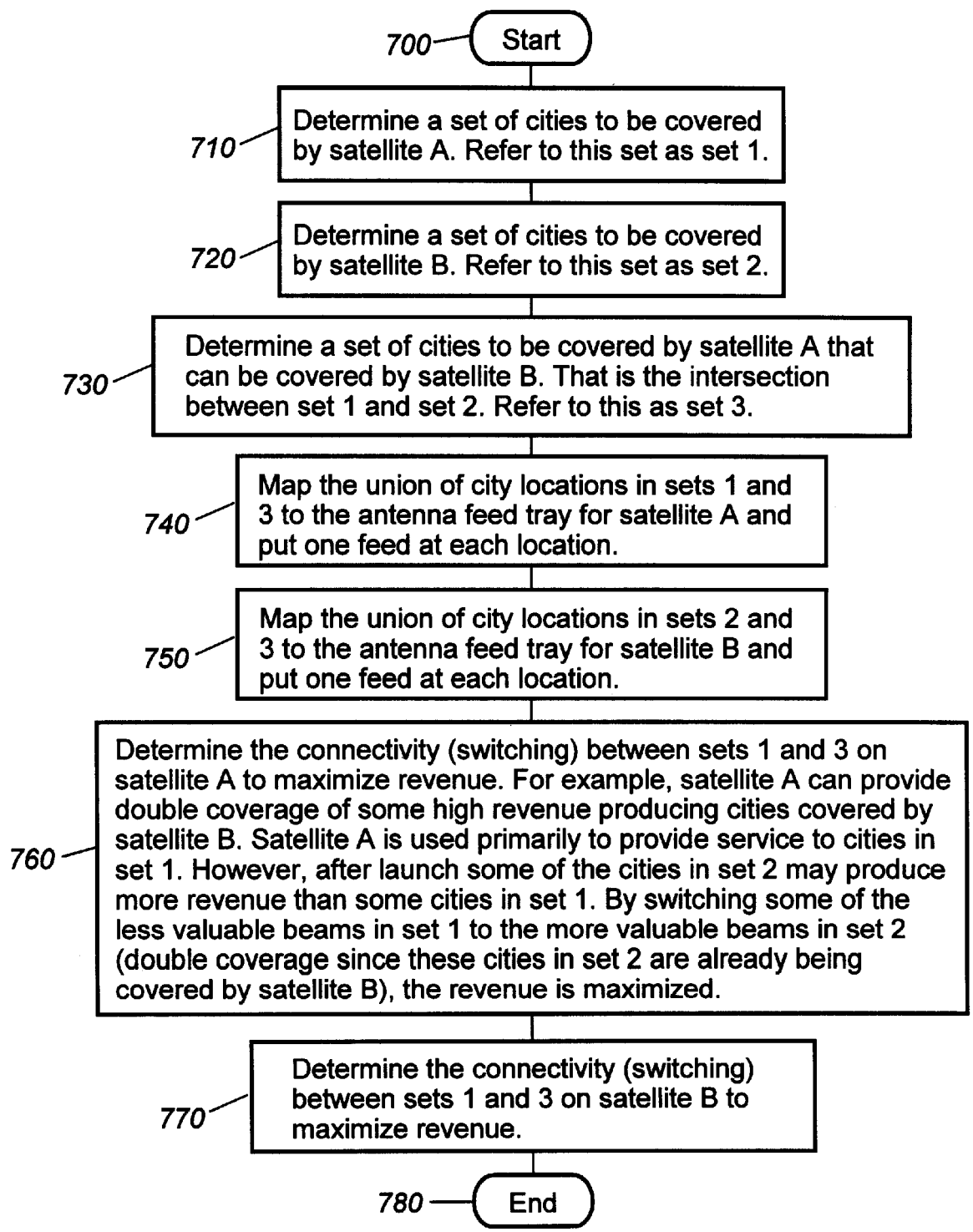
FIG. 7 is a flowchart illustrating the configuring of two satellites to provide dual coverage in an example embodiment of the present invention.
Figure 8:
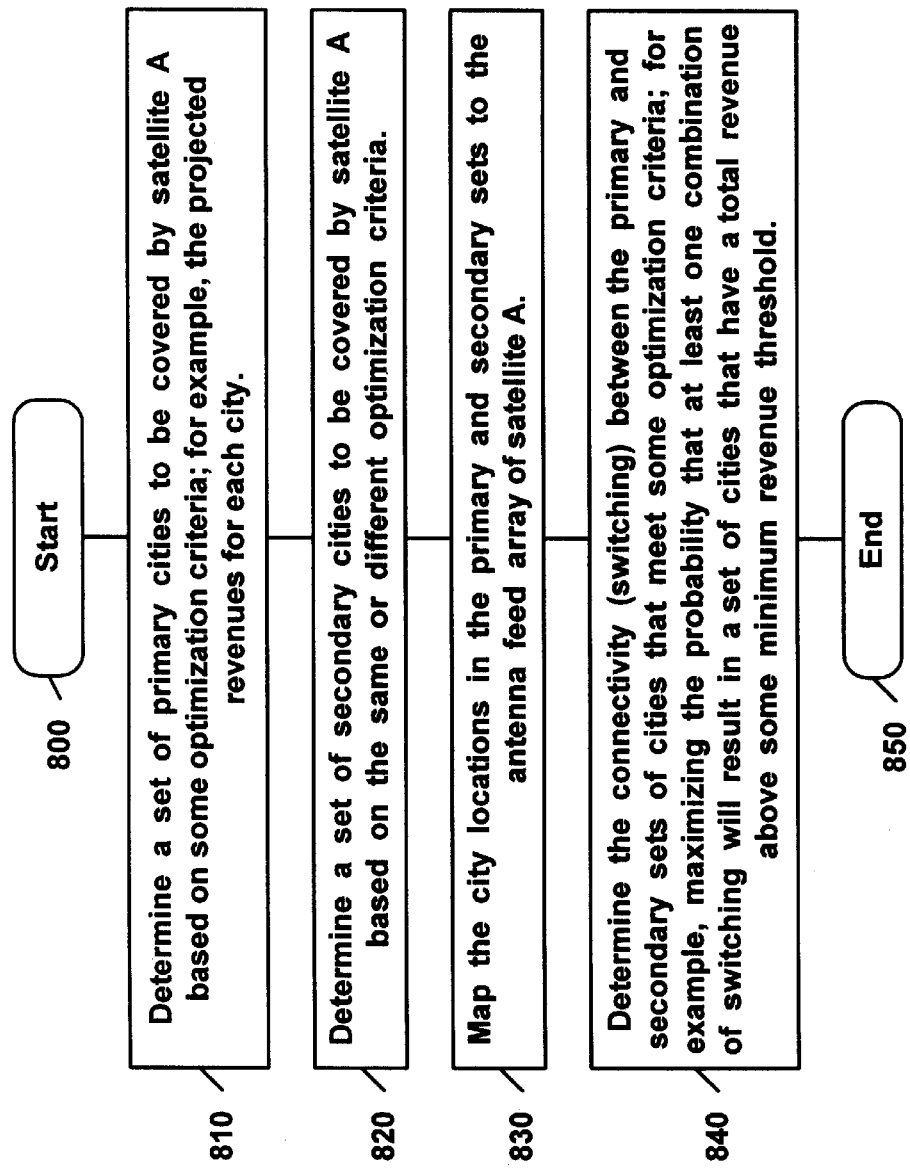
FIG. 8 is a flowchart illustrating configuring a satellite to provide maximum flexibility and coverage in an example embodiment of the present invention.
Figure 9:
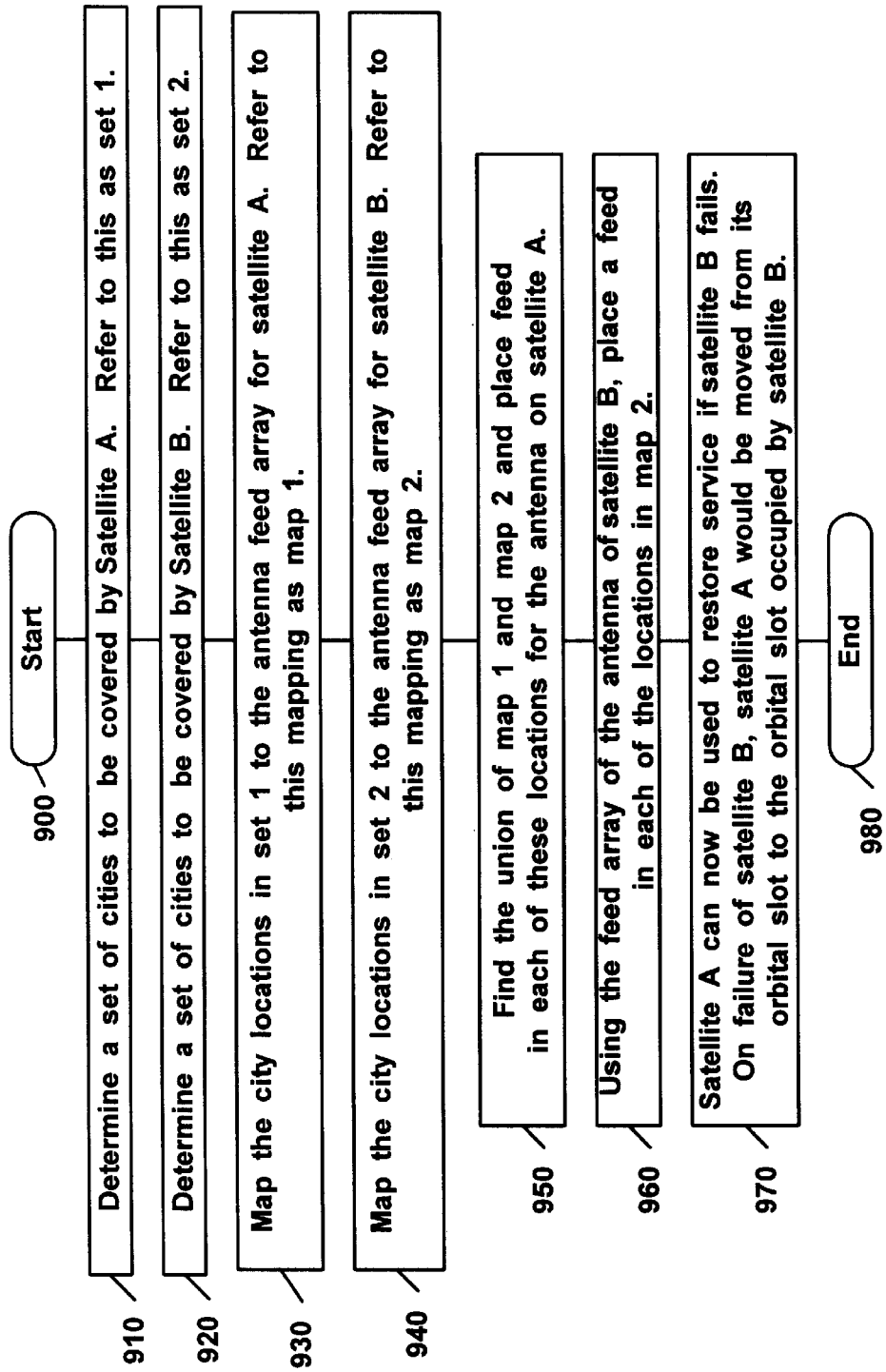
FIG. 9 is a flowchart illustrating configuring a satellite in a particular longitudinal slot to act as backup for another satellite in another longitudinal slot in an example embodiment of the present invention.

FIG. 4 is a diagram illustrating the coverage areas of a failed satellite being taken over by two other satellites in an example embodiment of the present invention, as further detailed in FIGS. 7 through 9. As illustrated in FIG. 4, satellites 300 and 320 are operational, while satellite 310 has experienced a failure. Satellite 310 would normally generate spot beams 420 and 430. However, with the failure of satellite 310 the geographical areas corresponding to spot beams 420 and 430 are no longer covered. However, as detailed in FIG. 7 it is possible to configure satellites to provide dual coverage for any given geographical area.

Therefore, satellite 300 may also cover the areas for spot beams 420, as well as spot beams 400, while satellite 320 would generate spot beams 430, as well as spot beam 410. This may be done as discussed in further detail in reference to FIG. 7 relating to the method for configuring satellites for dual coverage. In addition, it may be possible to utilize the operations illustrated in FIG. 8 to configure satellites for flexible coverage.

Figure 5:
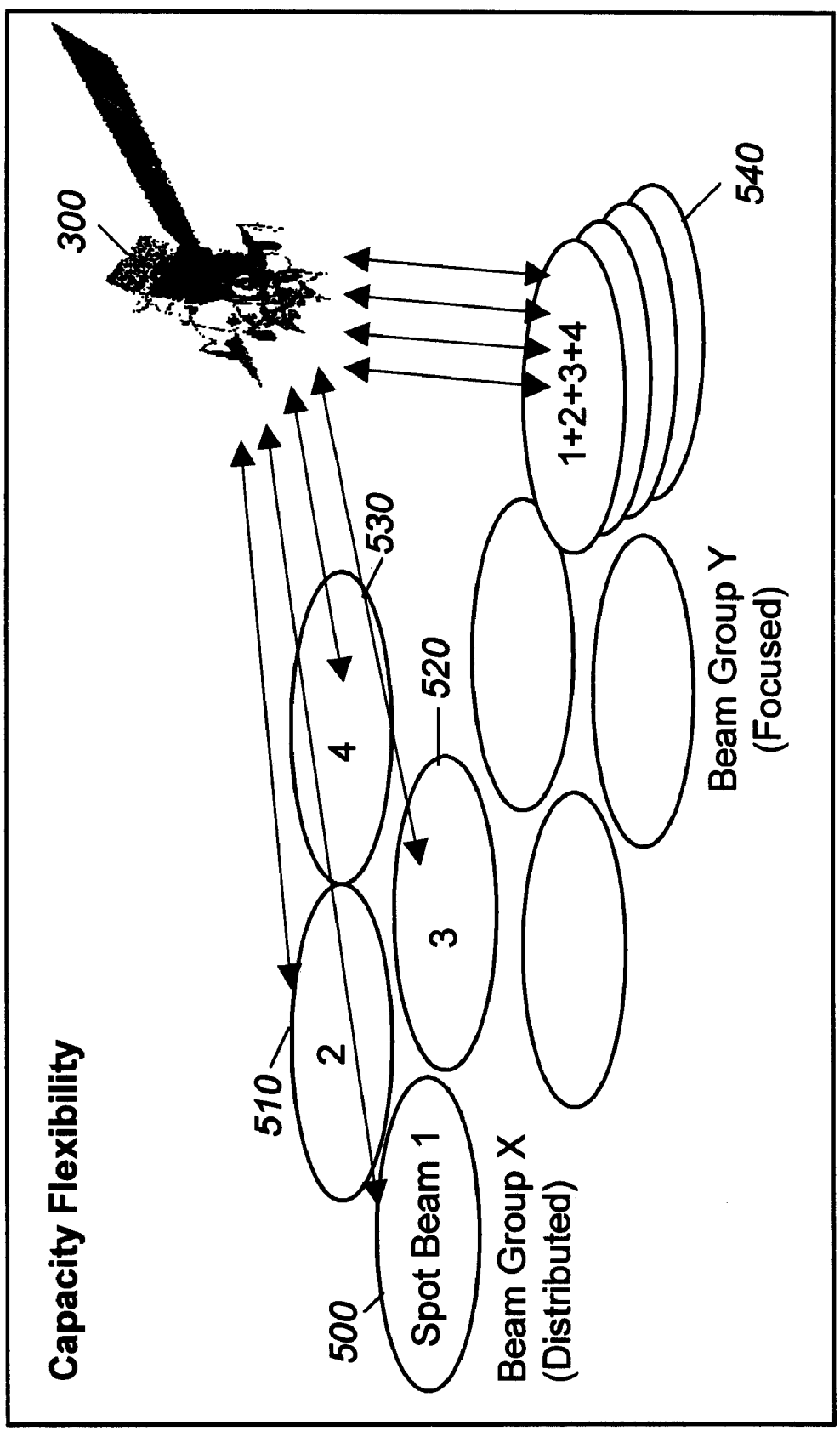
FIG. 5 is a diagram illustrating the switching of spot beams in a single satellite in order to concentrate on a single geographical area where demand has unexpectedly increased in an example embodiment of the present invention.

FIG. 5 is a diagram illustrating the switching of spot beams in a single satellite in order to concentrate on a single geographical area where demand has unexpectedly increased in an example embodiment of the present invention. In this example embodiment, a single satellite 300 is depicted in which spot beams 500, 510, 520 and 530 are typically covered by the feeds located within the antenna of satellite 300. The hemispherical earth coverage satellite makes it possible to build coverage flexibility into each antenna through the placement of additional feeds that could be activated upon the issuance of a ground station 30 command. As indicated in FIG. 5, tour feeds could be directed to the same geographical area as spot beams 540. Therefore, when unanticipated demand arises within a particular area, it is possible to have additional feeds, which would not normally be active, oriented to service a particular geographical area. Altering which group of feeds are active at any given moment in time could be done, utilizing either hardware or software or any combination or by any well-known mechanism.

Figure 6:
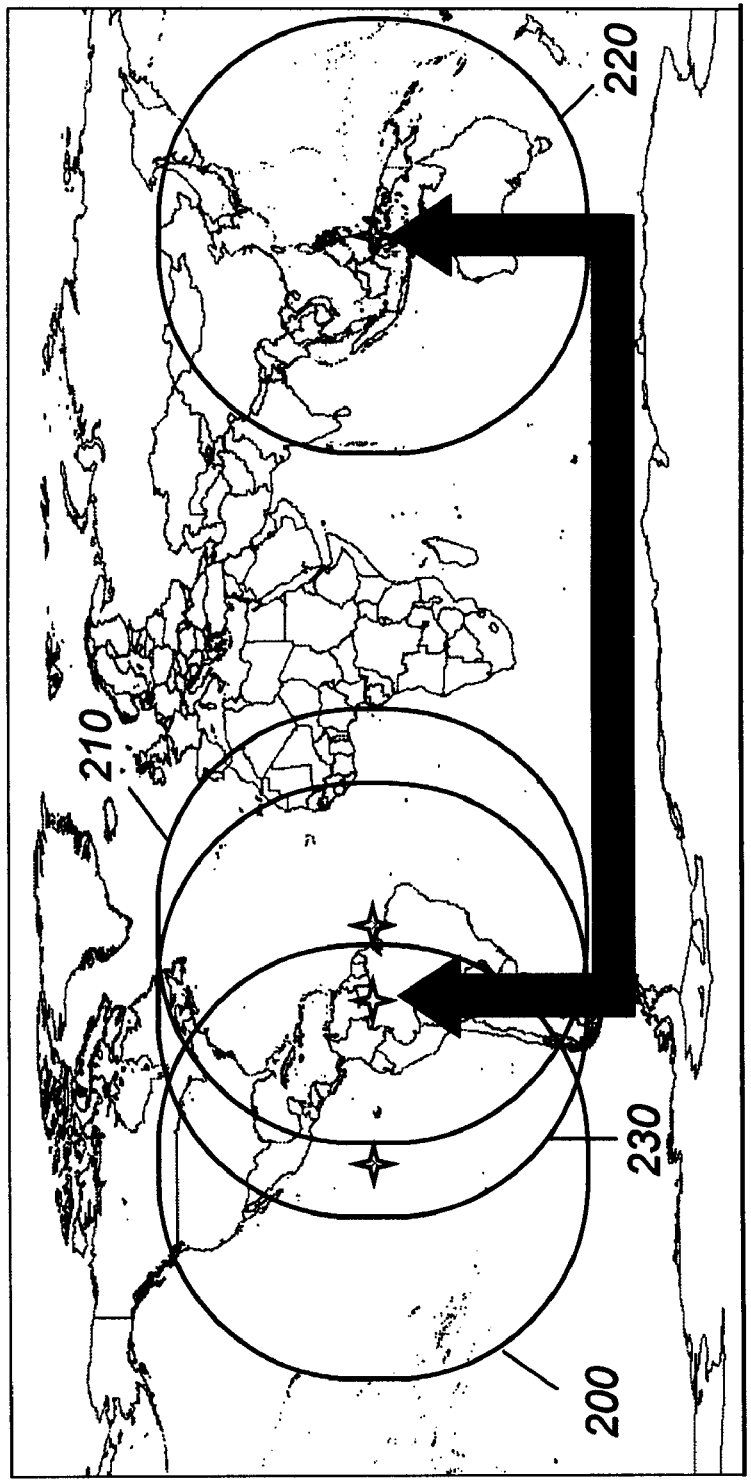
FIG. 6 is a diagram illustrating the movement of a satellite to another longitudinal location in order to take over the coverage of a failed satellite or to provide additional capacity when needed to meet demand in an example embodiment of the present invention, as further detailed in FIGS. 7 through 9.

FIG. 6 is a diagram illustrating the movement of a satellite to another longitudinal location in order to take over the coverage of a failed satellite or to provide additional capacity when needed to meet demand in an example embodiment of the present invention, as detailed further in FIG. 9. As exemplified in FIG. 6, coverage areas 200, 210 and 220 would be covered by separate satellites. However, in the case of the failure of the satellite covering area 210, it is possible to move the satellite handling coverage area 220 to a longitudinal position so that it now has a coverage area 230. However, since the satellite was originally designed to handle locations in coverage area 220 it is unlikely that any of the feeds would generate spot beams that would be associated with major population centers in the new longitudinal location. However, again utilizing the hemispherical earth coverage satellite populated with excess feed horns and excess feed capacity, it is possible to configure the feed horns prior to launch in groups so that one group of feeds would handle coverage area 220, but also a second set of feeds could be designed to handle coverage area 230. It should be noted that these two sets of feeds may overlap, with several feeds utilized in both sets. The process utilized to enable this movement of a satellite to cover a new longitudinal area is discussed in further detail in reference to FIG. 9.

FIGS. 7 through 9 are flowcharts of the processes used in the embodiments of the present invention. These processes may be implemented manually, in software, firmware, or hardware, or any combination of the foregoing methods. The elements illustrated in FIGS. 7–9 represent operations, modules, code, code segments, commands, firmware, hardware, instructions and data that may be executable by a processor-based system(s) and may be written in a programming language, such as, but not limited to, C++.

FIG. 7 is a flowchart illustrating the configuring of two satellites to provide dual coverage in an example embodiment of the present invention. Processing begins in operation 700 and immediately proceeds to operation 710. In operation 710, a determination is made of cities or population centers that will be covered by a particular satellite A, such as satellite 300 previously discussed. This set of population centers is given the arbitrary designation of set number one. In operation 720 another set of cities or population centers are identified to be covered by spot beams emanating from a second satellite B, such as satellite 310 previously discussed. This second set of population centers is arbitrary designated as set number two. The criteria utilized in the selection of population centers may include, but are not be limited to, overall population size, projected population growth, demographics, demand for service, projected demand for service, economic growth and stability, etc. As would be appreciated by one of ordinary skill in the art, a database containing the foregoing criteria associated with each population center may be generated, as well as a priority schema for ranking the population centers for sorting and selection by computer program.

Still referring to FIG. 7, processing then proceeds to operation 730. In operation 730, it is determined which population centers are covered by both satellite A and satellite B. This may also be accomplished by software that determines the intersection between population centers in set number one and population centers in set number two. This intersection of population centers between sets number one and number two would be designated as set number three. In operation 740, the union of sets number one and three, representing population center locations, would then be mapped into the antenna feed array for satellite A, such that at least one feed would be associated and properly positioned for a given population center. The determination of which feeds to select for each population center and the alignment of each feed would be a mathematical process of mapping, readily accomplished utilizing a computer program knowing the longitudinal position for the designated satellite. In operation 750, the union of sets number two and three of population center locations would then be mapped into the antenna feed array for satellite B, such that at least one feed would be associated and property positioned for a given population center. Again, the determination of which feeds to select for each population center and the alignment of each feed would be a mathematical process readily accomplished utilizing a computer program knowing the longitudinal position for the designated satellite. Processing then proceeds to operation 760.

Still referring to FIG. 7, in operation 760 a determination is made of the connectivity between set number one and set number three on satellite A to maximize revenue. For example, satellite A may provide double coverage of some high revenue producing population centers that are also covered by satellite B. It should be noted that satellite A is primarily used to service the population centers in set number one. However, after launch it may be determined that some population centers in set number two may produce significantly more revenue than those in set number one. By being able to switch feeds and spot beams from less profitable population centers in set number one to more profitable population centers in set number two, potential revenue may be maximized. This would of course entail the double coverage of the highly profitable population centers by both satellite A and satellite B. Thereafter, in operation 770, the connectivity between sets two and three on satellite B is determined for maximum revenue in a similar fashion as that previously discussed for satellite A in operation 760. Thereafter, processing proceeds to operation 780 where processing terminates.

FIG. 8 is a flowchart illustrating configuring a satellite to provide the maximum flexibility and coverage in an example embodiment of the present invention. Processing begins in operation 800 and immediately proceeds to operation 810. In operation 810, a determination is made for selection of primary cities or population centers to be covered by spot beams generated by satellite A. As previously discussed, the criteria utilized in the selection of population centers may include, but is not be limited to, overall population size, projected population growth, demographics, demand for service, projected demand for service, economic growth and stability, etc. As would be appreciated by one of ordinary skill in the art, a database containing the foregoing criteria associated with each population center may be generated, as well as a priority schema for ranking the population centers for sorting and selection by computer program. In operation 820, a second set of population centers to be covered by satellite A is determined based upon the same selection criteria previously discussed or a different set of selection criteria. Thereafter, in operation 830 the first set of population centers generated in operation 810 and the second set of population. centers generated in operation 820 are mapped to the antenna feed array of satellite A. Where the first set of population centers overlaps with the second set of population centers, a determination may be made of whether to apply a single feed for a given population center or two feeds. Processing then proceeds to operation 840 where the connectivity or switching between the first set of population centers and second set of population centers is determined to meet one or more optimization criteria. For example, this criterion may be the selection of population centers that will produce revenue that exceeds a certain minimum required. Thereafter, processing proceeds to operation 850 where processing terminates.

FIG. 9 is a flowchart illustrating configuring a satellite in a particular longitudinal slot to act as backup for another satellite in another longitudinal slot in an example embodiment of the present invention. Processing begins in operation 900 and immediately proceeds to operation 910. In operation 910, a set of population centers to be covered by satellite A is determined and arbitrarily referred to as set number one. In operation 920, a set of cities is determined to be covered by satellite B. and is referred to arbitrarily as set number two. As previously discussed, the criteria utilized in the selection of population centers may include, but is not limited to, overall population size, projected population growth, demographics, demand for service, projected demand for service, economic growth and stability, etc. As would be appreciated by one of ordinary skill in the art, a database containing the foregoing criteria associated with each population center may be generated, as well as a priority schema for ranking the population centers for sorting and selection by a computer program. Processing then proceeds to operation 930 where the population centers designated set number one are mapped to the antenna feed array for satellite A and labeled as map number one. In operation 940 the population centers designated set number two are mapped to the antenna feed array for satellite B and labeled as map number two. Thereafter, processing proceeds to operation 950 where the union between map one and map two is determined, and feeds in the antenna on satellite A are determined for the union of population centers in both map one and map two. In operation 960 a feed is selected in the feed array of the antenna of satellite B using the population centers designated in map two. Thereafter in operation 970, due to the coverage created in operation 950 and 960, satellite A may now be utilized to cover the population centers covered by satellite B, since satellite A now has feeds oriented towards spot beams for the population centers designated for service by satellite B. This would entail physically moving satellite A to a different longitudinal position in geo-synchronous orbit and turning on the feeds that would be normally handled for that location in orbit by satellite B. Of course the prior feeds utilized by satellite A would be turned off once repositioning is accomplished. Processing then proceeds to operation 980 where processing terminates.

While we have shown and described only a few examples herein, it is understood that numerous changes and modifications, as known to those skilled in the art, could be made to the present invention. For example, any type of computer architecture may be utilized for the embodiments of present invention. Further, the present invention may be implemented in any general-purpose computer language, or the method steps of the invention could even be performed manually. Therefore, we do not wish to be limited to the details shown and described herein, but intend to cover all such changes and modifications as are encompassed by the scope of the appended claims.

What is claimed is:

1. A method of configuring a constellation of satellites, said method comprising:

determining a first set of population centers to be covered by a first satellite;

determining a second set of population centers to be covered by a second satellite;

determining a third set of population centers, wherein the third set of population centers is all common population centers between the first set of population centers and the second set of population centers;

mapping a first union of the first set of population centers and the third set of population centers onto a feed antenna array for the first satellite; and mapping a second union of the second set of population centers and the third set of population centers onto a feed antenna array and for the second satellite.

2. The method recited in claim 1, further comprising:

determining the connectivity between the first set of population centers and the third set of population centers on the first satellite to maximize revenue received from the first satellite.

3. The method recited in claim 2, further comprising:

determining the connectivity between the first set of population centers and the third set of population centers to maximize revenue from the second satellite.

4. The method recited in claim 3, wherein determining the first set of population centers to be covered by the first satellite, further comprises:

selecting population centers based on overall population size, projected population growth, demographics, demand for service, projected demand for service, economic growth and stability.

5. The method recited in claim 4, wherein determining the second set of population centers to be covered by the second satellite, further comprises:

selecting population centers based on overall population size, projected population growth, demographics, demand for service, projected demand for service, economic growth and stability.

6. The method recited in claim 5, wherein the first satellite and the second satellite are located in different longitudinal locations in geo-synchronous orbits.

7. The method recited in claim 6, wherein when a failure occurs on the first satellite, the second satellite switches over to cover population centers handled by the first satellite upon receipt of a command from a ground station.

8. The method recited in claim 6, wherein when a failure occurs on the second satellite, the first satellite switches over to cover population centers handled by the second satellite upon receipt of a command from a ground station.

9. A method of configuring feeds on an antenna of a satellite, said method comprising:
   determining a first set of primary population centers to be covered by the satellite;
   determining a second set of secondary population centers to be covered by the satellite;
   mapping the first set and the second set into the feeds of the antenna of the satellite; and
   determining the connectivity between the first set and the second set to maximize the probability that at least a combination of switching feeds will result in a set of population centers that have a total revenue above a minimum threshold value.

10. The method recited in claim 9, wherein determining the first set of primary population centers to be covered by the satellite, further comprises:
    selecting population centers based on overall population size, projected population growth, demographics, demand for service, projected demand for service, economic growth and stability.

11. The method recited in claim 10, wherein determining the second set of secondary population centers to be covered by the satellite, further comprises:
    selecting population centers based on overall population size, projected population growth, demographics, demand for service, projected demand for service, economic growth and stability.

12. The method recited in claim 9, wherein determining the connectivity between the first set and the second set maximizes revenue received from the satellite.

13. A method of configuring a plurality of feeds on a plurality of satellites to supply backup redundancy for a failed satellite; said method comprising:
    determining a first set of population centers to be covered by a first satellite;
    determining a second set of population centers to be covered by a second satellite;
    mapping the first set of population centers onto the feed array of the first satellite;
    mapping the second set of population centers onto the feed array of the second satellite;
    determining the union between the mapped first set of population centers and the mapped second set of population centers; and
    mapping the union onto the feed array of the first satellite.

14. The method recited in claim 13, further comprising:
    moving the first satellite to a longitudinal position in proximity of the second satellite when a failure is detected in the second satellite.

15. The method recited in claim 14, wherein the first satellite activates the union of feeds and the feeds mapped to the first satellite for the second satellite.

16. The method recited in claim 15, wherein upon activation of the union of feeds and the feeds mapped to the first satellite, the second satellite establishes communications with a plurality of ground stations previously communicated to by the second satellite.

17. The method recited in claim 16, further comprising: taking the second satellite offline.

18. A computer program embodied on a computer readable medium and executable by a computer for configuring a constellation of satellites, comprising:
    determining a first set of population centers to be covered by a first satellite;
    determining a second set of population centers to be covered by a second satellite;
    determining a third set of population centers, wherein the third set of population centers is all common population centers between the first set of population centers and the second set of population centers;
    mapping a first union of the first set of population centers and the third set of population centers onto a feed antenna array for the first satellite; and
    mapping a second union of the second set of population centers and the third set of population centers onto a feed antenna array and for the second satellite.

19. The computer program recited in claim 18, further comprising:
    determining the connectivity between the first set of population centers and the third set of population centers on the first satellite to maximize revenue received from the first satellite.

20. The computer program recited in claim 19, further comprising:
    determining the connectivity between the first set of population centers and the third set of population centers to maximize revenue from the second satellite.

21. The computer program recited in claim 20, wherein determining the first set of population centers to be covered by the first satellite, further comprises:
    selecting population centers based on overall population size, projected population growth, demographics, demand for service, projected demand for service, economic growth and stability.

22. The computer program recited in claim 21, wherein determining the second set of population centers to be covered by the second satellite, further comprises:
    selecting population centers based on overall population size, projected population growth, demographics, demand for service, projected demand for service, economic growth and stability.

23. The computer program recited in claim 22, wherein the first satellite and the second satellite are located in different longitudinal locations in geo-synchronous orbits.

24. The computer program recited in claim 23, wherein when a failure occurs on the first satellite, the second satellite switches to cover population centers handled by the first satellite upon receipt of a command from a ground station.

25. The computer program recited in claim 24, wherein when a failure occurs on the second satellites the first satellite switches over to cover population centers handled by the second satellite upon receipt of a command from a ground station.

26. A computer program for configuring feeds on an antenna of a satellite, comprising:
    determining a first set of primary population centers to be covered by the satellite;
    determining a second set of secondary population centers to be covered by the satellite;
    mapping the first set and the second set into the feeds of the antenna of the satellite; and
    determining the connectivity between the first set and the second set to maximize the probability that at least a combination of switching feeds will result in a set of population centers that have a total revenue above a minimum threshold value.

27. The computer program recited in claim 26, wherein determining the first set of primary population centers to be covered by the satellite, further comprises:

selecting population centers based on overall population size, projected population growth, demographics, demand for service, projected demand for service, economic growth and stability.

28. The computer program recited in claim 27, wherein determining the second set of secondary population centers to be covered by the satellite, further comprises:

selecting population centers based on overall population size, projected population growth, demographics, demand for service, projected demand for service, economic growth and stability.

29. The computer program recited in claim 26, wherein determining the connectivity between the first set and the second set maximizes revenue received from the satellite.

30. A computer program for configuring a plurality of feeds on a plurality of satellites to supply backup redundancy for a failed satellite; comprising:

determining a first set of population centers to be covered by a first satellite;

determining a second set of population centers to be covered by a second satellite;

mapping the first set of population centers onto the feed array of the first satellite;

mapping the second set of population centers onto the feed array of the second satellite;

determining the union between the mapped first set of population centers and the mapped second set of population centers; and mapping the union onto the feed array of the first satellite.

31. The computer program recited in claim 30, further comprising:

moving the first satellite to a longitudinal position in proximity of the second satellite when a failure is detected in the second satellite.

32. The computer program recited in claim 31, wherein the first satellite activates the union of feeds and the feeds mapped to the first satellite for the second satellite.

33. The computer program recited in claim 32, wherein upon activation of the union of feeds and the feeds mapped to the first satellite, the second satellite establishes communications with a plurality of ground stations previously communicated to by the second satellite.

* * * * *